United States Patent
Göbl et al.

[19]

[11] Patent Number: 6,080,217
[45] Date of Patent: Jun. 27, 2000

[54] DEVICE FOR SEPARATING EXCESS POWDER OVERSPRAYED WHEN POWDER COATING WORKPIECES

[75] Inventors: Otmar Göbl, Altach, Austria; Horst Adams, St. Gallen, Switzerland

[73] Assignee: Wagner International AG, Alstatten, Switzerland

[21] Appl. No.: 09/072,728

[22] Filed: May 4, 1998

[30] Foreign Application Priority Data

May 13, 1997 [DE] Germany ............................ 197 20 005

[51] Int. Cl.[7] .................................................. B01D 46/00
[52] U.S. Cl. ............................ 55/283; 55/302; 55/385.2; 55/429; 55/456; 55/DIG. 46
[58] Field of Search ............................... 55/385.1, 385.2, 55/429, 447, 456, 450, DIG. 46, 302, 283

[56] References Cited

U.S. PATENT DOCUMENTS

| | | | |
|---|---|---|---|
| 3,992,177 | 11/1976 | Welteroth | 55/447 |
| 4,074,975 | 2/1978 | Tokura et al. | 55/447 |
| 4,269,112 | 5/1981 | Cordier | 55/DIG. 46 |
| 4,378,728 | 4/1983 | Berkmann | 55/DIG. 46 |
| 5,262,046 | 11/1993 | Forgac et al. | 55/447 |
| 5,591,240 | 1/1997 | Ophardt et al. | 55/DIG. 46 |
| 5,803,954 | 9/1998 | Gunter et al. | 55/429 |
| 5,912,370 | 6/1999 | McConkey | 55/385.3 |

FOREIGN PATENT DOCUMENTS

| | | |
|---|---|---|
| 0 476 169 B1 | 9/1990 | European Pat. Off. . |
| 0 681 871 A2 | 11/1995 | European Pat. Off. . |
| 32 29 756 A1 | 2/1984 | Germany . |
| 41 34 701 A1 | 4/1993 | Germany . |
| 87032 | 11/1952 | Netherlands ............................. 55/447 |
| 386215 | 5/1961 | Switzerland ............................. 55/447 |
| 676231 | 8/1949 | United Kingdom ..................... 55/447 |

*Primary Examiner*—David A. Simmons
*Assistant Examiner*—Mihn-Chau T. Pham
*Attorney, Agent, or Firm*—Fenwick & West LLP

[57] ABSTRACT

A means for separating excess powder oversprayed when powder coating workpieces and sucked off in a gas/powder stream, including powder discharge via a lower collector (12, 13, 14) and clean gas discharge into an upwardly disposed clean gas channel (7) via at least one immersion pipe (5) depending from the bottom (6) of the clean gas channel (7) and dipping into a cyclone pipe (4), is characterized in that the aspired gas/powder stream is passed axially into the cyclone pipe (4) and set into circulating motion via a whirl generating means (3) arranged in an annular gap (22) formed between the immersion pipe (5) and the cyclone pipe (4), and the bottom (6) of the clean gas channel is lowerable against the cyclone pipe (4) from the operative position in which it seals the clean gas channel, into a cleaning position.

14 Claims, 4 Drawing Sheets

DEVICE FOR SEPARATING EXCESS POWDER OVERSPRAYED WHEN POWDER COATING WORKPIECES

FIELD OF THE INVENTION

The instant invention relates to a means for separating excess powder which was oversprayed in the process of powder coating workpieces.

BACKGROUND OF THE INVENTION

Apparatus of the kind, with which powder discharge is effected by way of a lower collector, clean gas discharge is effected into an upwardly disposed clean gas channel via at least one immersion pipe which depends from the bottom of the clean gas channel and dips into a cyclone pipe into which the drawn-off gas/powder stream can be introduced axially, an annular gap between the immersion pipe and the cyclone pipe comprises a whirl generating means to set the gas/powder stream into circulating motion, belong to the state of the art (DE 32 29 756 A1, DE 41 34 701 A1, EP 0 681 871 A2).

During electrostatic coating, workpieces are transported through a powder booth to be coated with powder from spray devices. Not all of the powder actually reaches the workpiece surfaces to be coated. The excess powder which is oversprayed must be removed quickly from the powder coating booth to allow colors to be changed and for the powder to be ready for renewed use or disposal.

SUMMARY OF THE INVENTION

It is the object of the invention to provide a means of the kind mentioned initially which will permit rapid color change in powder coating processes.

With the means according to the invention, the bottom of the clean gas channel is lowered, together with the immersion pipe suspended from it, in order to bring the means into the cleaning position when the color is to be changed. The immersion pipe thus enters into the corresponding cyclone pipe whereby the flow cross section for the purging gas is reduced. As a consequence, the flow velocity in the cyclone pipe rises considerably and any powder sticking to the wall surfaces of the means is entrained so that the cleaning effect is obtained automatically without requiring any additional equipment, such as cleaning nozzles as known from EP 0 476 169 B1.

Preferably, a stilling chamber is provided between the bottom of the clean gas channel and the upper end of the cyclone pipe. The powder/gas stream which is drawn off is fed into this stilling chamber through an inlet channel opening into the wall of the stilling chamber. From the stilling chamber, it is passed from above into the inlet end of the cyclone pipe and set into circulating motion by an angular momentum or "whirl" generating means, preferably embodied by a turning vane ring. Then it is deflected upwardly by 180°, whereby clean gas, freed of powder, is directed into the suction end of the immersion pipe, while powder particles deposited on the inside wall of the cyclone pipe trickle down into the collector.

BRIEF DESCRIPTION OF THE DRAWING

The invention will be described further, by way of example, with reference to the accompanying drawings, in which:

FIG. 1b is a cross sectional view along line A—A of FIG. 1a;

FIG. 3 is a cross sectional view along line B—B of FIG. 1a.

DESCRIPTION OF THE PREFERRED EMBODIMENT

Figure 1A:
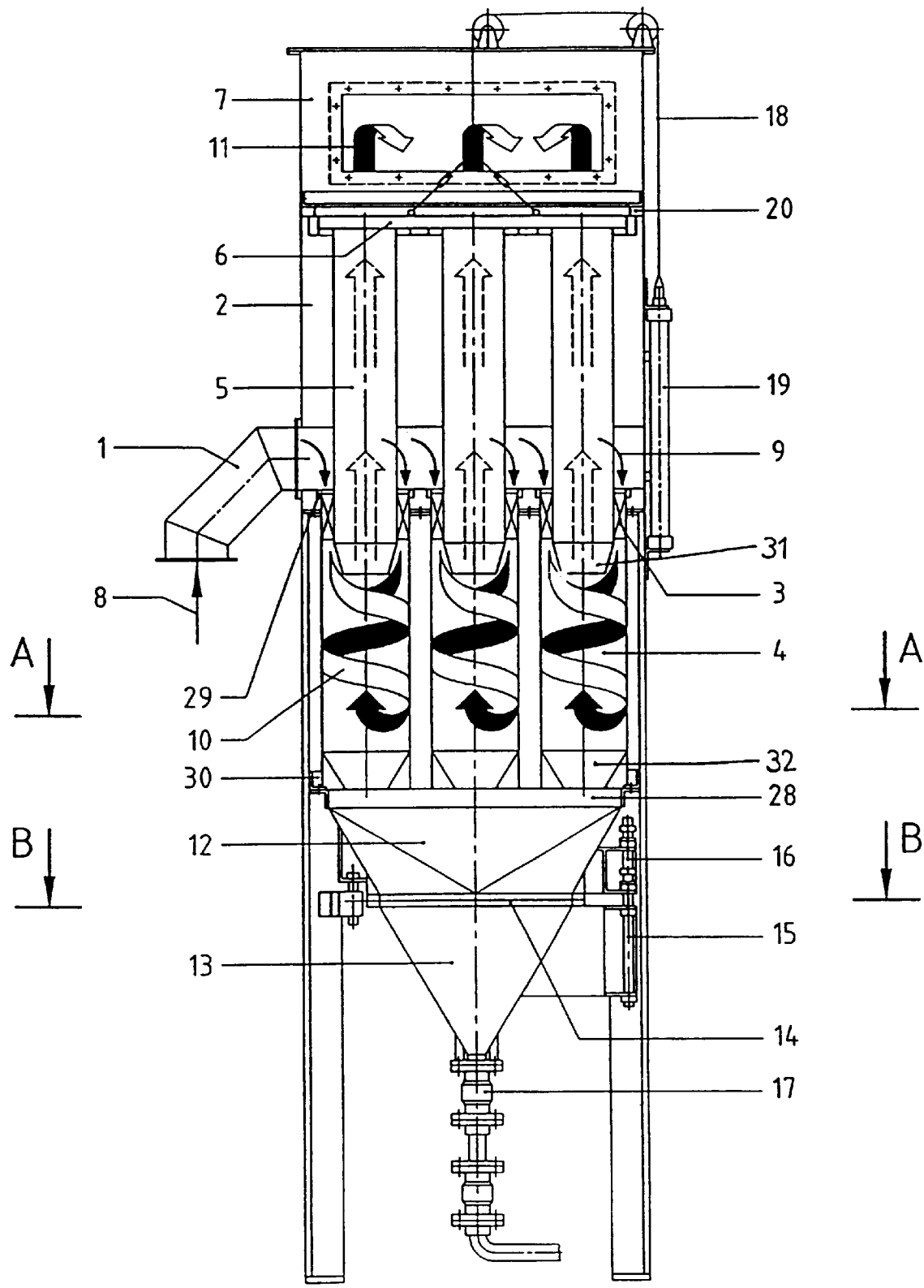
FIG. 1a is a longitudinal sectional elevation of a means according to the invention in operative position.
Figure 1B:
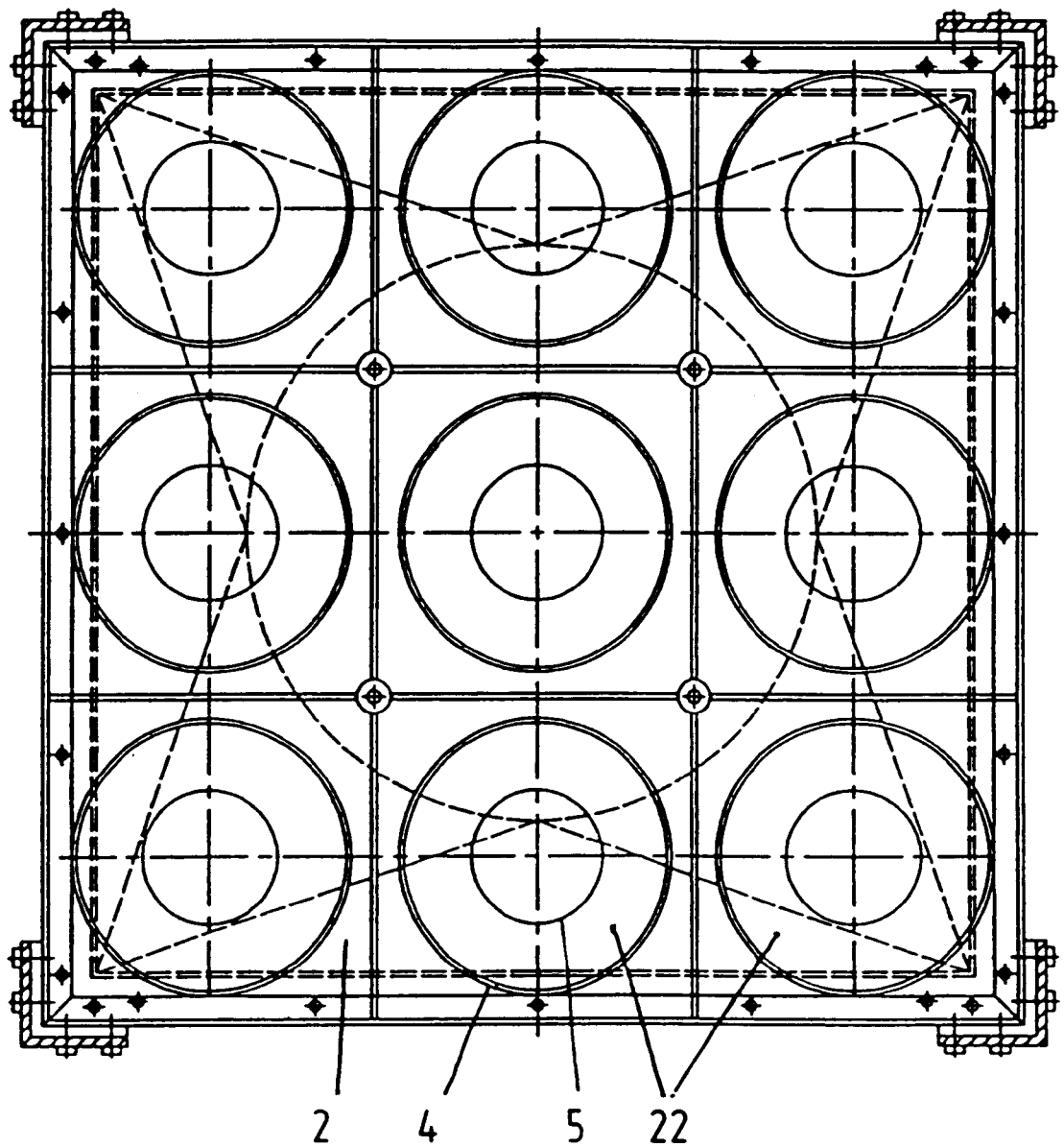

The figures illustrate a multicyclone means comprising a total of nine cyclone pipes. However, the invention may be realized also with a greater or smaller number of cyclone pipes, a single one in a borderline case. As shown in FIG. 1a, a powder/gas mixture—air normally serving as conveying gas flows through an inlet channel 1 into a stilling chamber 2 and continues its path downwardly across turning vane rings 3 into cyclone pipes 4. The turning vane rings 3 are firmly mounted on the outer peripheries of immersion pipes 5 depending from the bottom 6 of a clean gas channel 7. The bottom 6, at the same time, forms the ceiling of the stilling chamber 2.

In FIG. 1a the directions of flow of the incoming powder/air mixture 8 are marked by arrows, 9 indicating the flow through the turning vane rings 3, 10 indicating the cyclone flow proper, and 11 indicating the flow in the clean gas channel 7. The air is sucked out of the clean gas channel 7 in the direction of the observer.

The powder which is separated by centrifugal forces in the cyclone pipes 4 trickles down along the walls of the cyclone pipes, while the air which has been cleaned of powder is drawn off upwardly through the immersion pipes 5 into the clean gas channel 7.

A funnel-shaped collector, comprising a stationary part 12 and a part 13 which can be swung out, is arranged below the cyclone pipes 4. Between the two parts 12, 13 there is a screen 14 likewise adapted to be swung out. The lower part 13 of the collector and the screen 14 can be lowered by means of a pneumatic cylinder 15 and, being supported on a common axis of rotation 16, they can be swung out individually.

Figure 3:
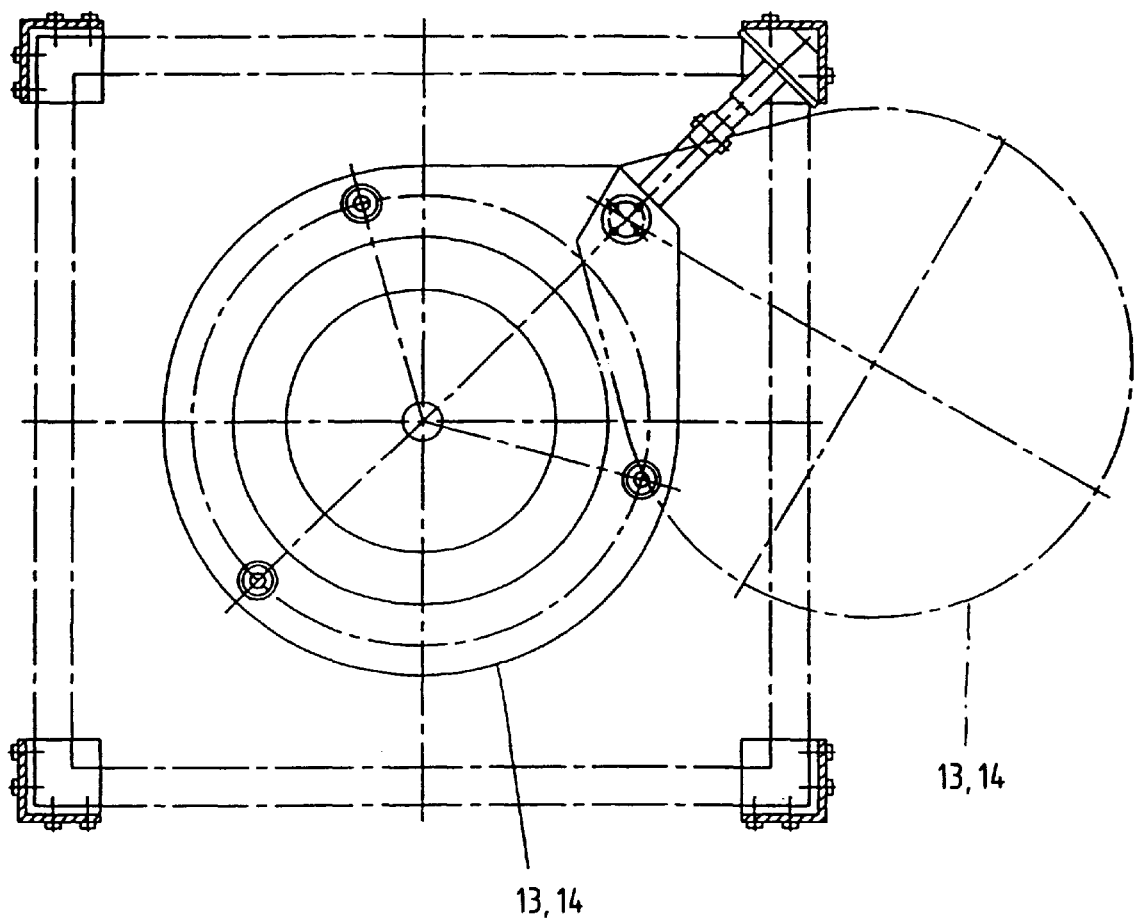

FIG. 3 illustrates a cut through the multicyclone at the level of the screen 14. The screen functions to free the powder from any foreign matter. At the lower end of the part 13 which is adapted for pivoting movement there is a conveying means 17 by which the powder is returned to a reservoir (not shown) for feeding spray guns.

Together with the bottom 6 of the clean gas channel 7 the immersion pipes 5 form a unit which is movable in vertical direction through the stilling chamber 2. The inside cleaning of the cyclone thus can be accomplished widely automatically.

To that end the bottom 6 of the clean gas channel 7 is connected, for example, by a cable 18 to a pneumatic cylinder 19. It is likewise possible to use any other known linear elevating means, such as zigzag-type lifting devices, pneumatic or hydraulic telescopic devices, and the like. In the ultimate upper position, the clean gas channel 7 is sealed pneumatically with respect to the stilling chamber 2 by a circumferential seal 20. When the bottom 6 of the clean gas channel 7 is lowered the immersion pipes 5 attached to it move downwardly into the cyclone pipes 4 until they reach a final position shown in FIG. 2. In this final position, the bottom 6 of the clean gas channel 7 is located at the level of the upper edge 21 of the air inlet channel.

Lowering of the immersion pipes 5 into the cyclone pipes 4 causes the axial length to change of annular gaps 22 which are defined between the immersion pipes 5 and the cyclone pipes 4. As this greatly reduces the cross sectional area open for the flow of air within the cyclone pipes, the flow velocity within a cyclone pipe rises sharply. As a consequence, any powder adhering to the inside walls 23 of the cyclone pipes 4 or to the outside walls 24 of the immersion pipes 5 is entrained by the air current so that these surface areas are cleaned automatically. With the means in this cleaning position, moreover, the suction opening 25 at the lower end of a conical constriction 31 of the immersion pipe 5 is located directly above the apex opening 26 at the lower end of a conical constriction 32 of the cyclone pipe 4, whereby any powder deposited on the inclined surfaces 27 of the constriction 32 is drawn off.

In persistent cases, the lower part 13 of the collector and the screen 14 may be lowered additionally so as to make the constrictions 32 of the cyclone pipes 4 accessible from outside for deposits to be blown off by means of a compressed air jet while the suction process is going on. The powder thus blown off by the compressed air jet is immediately sucked off through the immersion pipes 5, due to the high flow velocity. As the turning vane rings 3 were lowered together with the immersion pipes 5 they, too, are accessible from below to be swept by a compressed air jet, when in cleaning position.

The seal 20 between the upper stop and the bottom 6 of the clean gas channel 7 begins to open as soon as the lowering sets in so that an air gap forms between the inside wall of the clean gas channel and the bottom which is moving down. Through this gap, air is drawn upwardly at great velocity. The air gap moves along the entire inner wall surface of the stilling chamber 2 during the lowering procedure and, therefore, also the stilling chamber is cleaned automatically.

Figure 2:
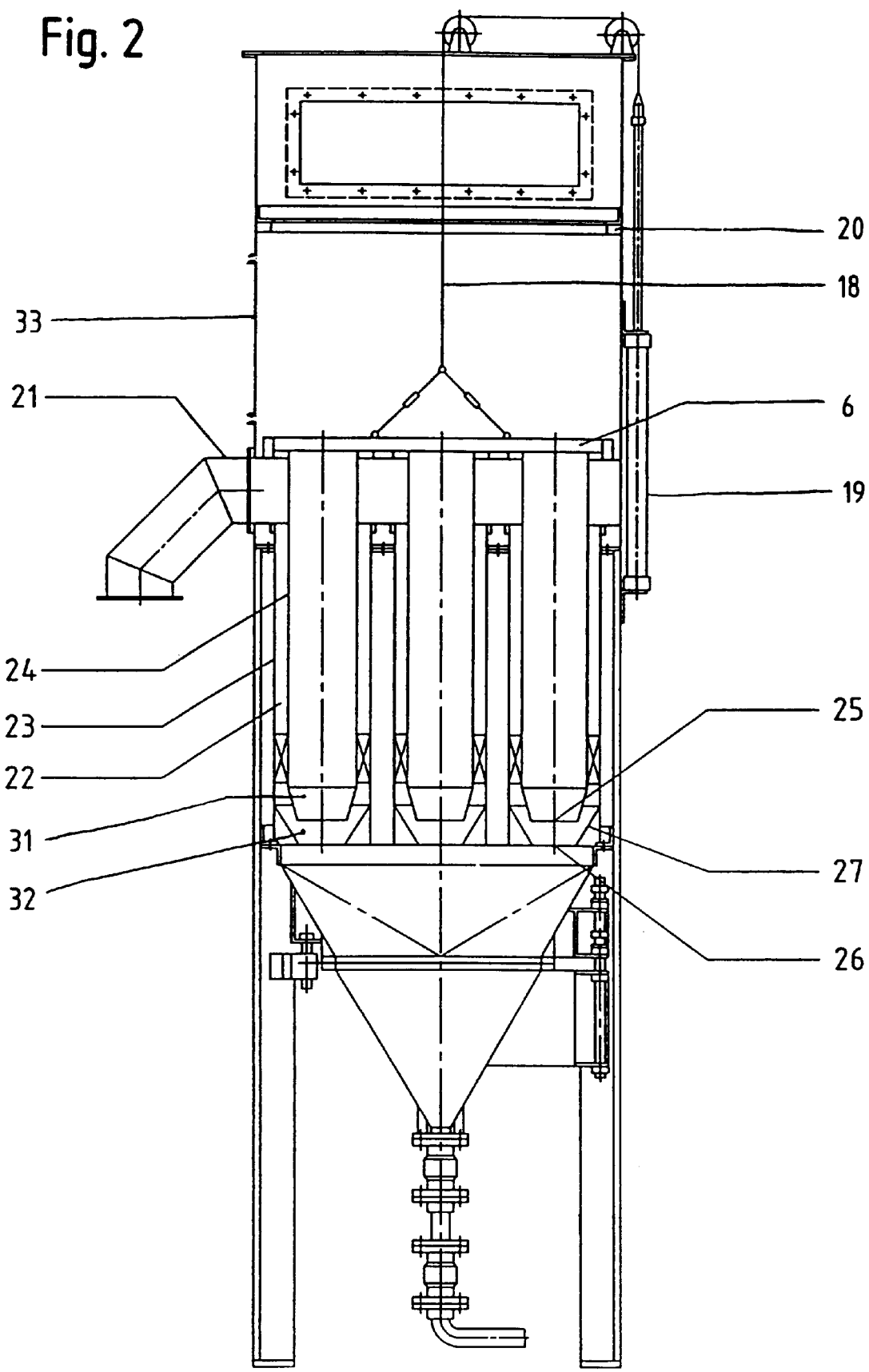
FIG. 2 is a longitudinal sectional elevation of a means according to the invention in cleaning position.

In a particularly advantageous embodiment of the invention the immersion pipes 5 can be pulled upwardly out of the bottom 6 of the clean gas channel 7, when the bottom has been lowered. In this manner immersion pipes may be exchanged individually. For this purpose, a servicing door 33 may be provided in the wall of the stilling chamber 2 between the seal 20 and the inlet channel 1, as indicated in FIG. 2. The immersion pipes may be removed from the cyclone casing through this door.

According to another especially advantageous modification, the lower ends of the cyclone pipes 4 are supported by a common backing plate 28 (FIG. 1a) which presses them upwardly against an abutment 29. The backing plate 28 is adapted to be lowered with its anchoring to such a level that the cyclone pipes 4 become free of the abutment 29 at the top and thus stand upright practically freely on the bottom backing plate 28. This makes it possible to remove the cyclone pipes 4 individually towards the side in order to replace them, if required (for example when sintered agglomerates have formed on them).

The immersion pipes 5 and/or the cyclone pipes 4 and/or the turning vane rings 3 are made of inexpensive plastic material which preferably can be recycled so that expensive scrubbing measures can be dispensed with when sintered material clings to them. Instead, the particular pipe which is affected (or the turning vane ring) can be exchanged and disposed of individually or prepared for renewed use.

What is claimed is:

1. A device for separating excess powder oversprayed when powder coating workpieces and sucked off in a gas/powder stream, including powder discharge via a lower collector (12, 13, 14) and clean gas discharge into an upwardly disposed clean gas channel (7) via at least one immersion pipe (5) depending from the bottom (6) of the clean gas channel (7) and dipping into a cyclone pipe (4), the aspired gas/powder stream being directed axially into the cyclone pipe (4) and to be set into circulating motion by an angular momentum generating means (3) arranged in an annular gap (22) formed between the immersion pipe (5) and the cyclone pipe (4), and the bottom (6) of the clean gas channel being movably lowerable against the cyclone pipe (4) from the operative position in which the bottom (6) seals the clean gas channel, into a cleaning position in which flow velocity of gas increases for enhanced cleaning effect.

2. The device as claimed in claim 1, wherein the bottom (6) of the clean gas channel (7) constitutes the ceiling of a stilling chamber (2) which extends up to the upper end of the cyclone pipe (4) and into the wall of which opens an inlet channel (1) for the gas/powder stream.

3. The device as claimed in claim 1, wherein the cyclone pipe (4) has a constriction (32) at the lower end of the cyclone pipe which opens into the collector (12, 13).

4. The device as claimed in claim 3, wherein the immersion pipe (5) has a suction opening (25) at the lower end of the immersion pipe and extending into the constriction (32) of the cyclone pipe (4), when in the lowered position.

5. The device as claimed in claim 1, wherein the collector (12, 13, 14) is funnel-shaped and comprises an upper stationary portion and a lower portion that is disposed to be selectively displaced from the upper stationary portion.

6. The device as claimed in claim 5 comprising a screen (14) disposed between the upper stationary portion and the lower portion to be selectively displaced from the upper stationary portion.

7. The device as claimed in claim 1, wherein the bottom (6) of the clean gas channel is lowerable into the cleaning position by an elevating means (18, 19).

8. The device as claimed in claim 7, wherein the elevating means (18, 19) comprises a cable (18) which is operable by a drive means (19).

9. The device as claimed in claim 1, wherein the angular momentum generating means (3) includes a tuning vane ring fixed to the outer periphery of the immersion pipe (5).

10. The device as claimed in claim 1, wherein a plurality of immersion pipes (5) depend from the bottom (6) and dip into corresponding cyclone pipes (4) supported on a backing plate (28) at the head of the collector (12, 13).

11. The device as claimed in claim 1, wherein the immersion pipe (5) is suspended exchangeably from the bottom (6).

12. The device as claimed in claim 10, wherein the cyclone pipe (4) is supported exchangeably on the backing plate (28).

13. The device as claimed in claim 1, wherein the immersion pipe (5) and the cyclone pipe (4) and the angular momentum generating means (3) are made of plastic material.

14. The device as claimed in claim 13, wherein the plastic material is recyclable plastic material.

\* \* \* \* \*